United States Patent

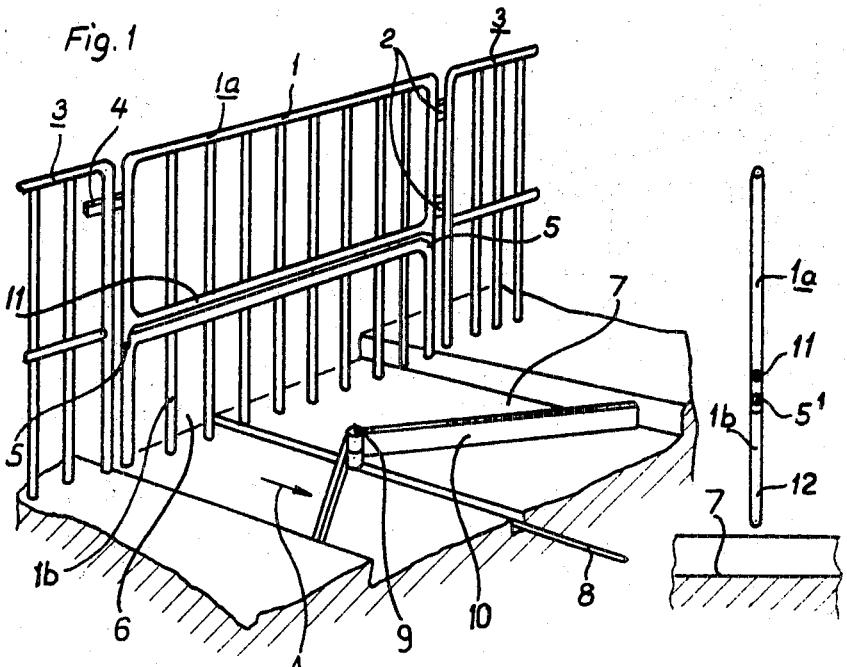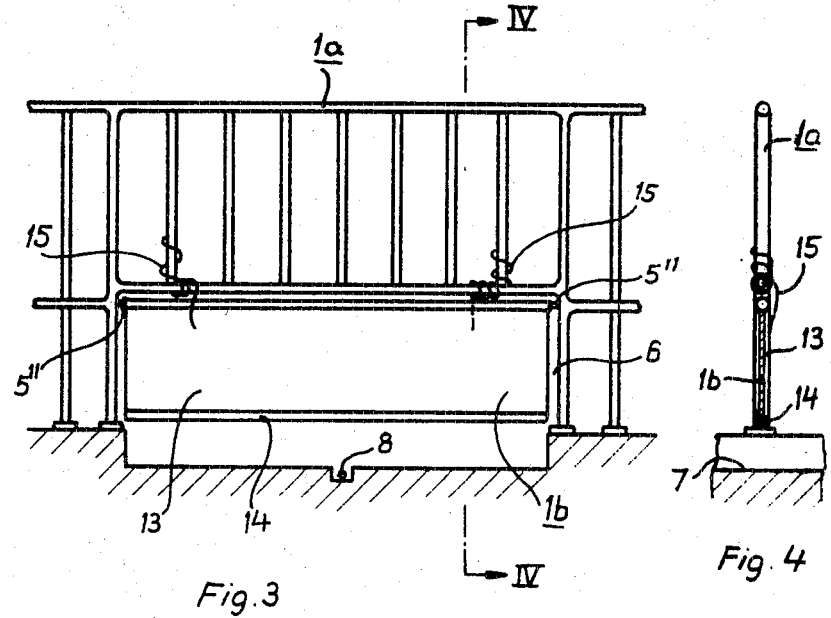

[11] 3,577,956

| [72] | Inventor | Adolf G. Forster |
| | | Augsburg, Germany |
| [21] | Appl. No. | 825,160 |
| [22] | Filed | May 16, 1969 |
| [45] | Patented | May 11, 1971 |
| [73] | Assignee | Alfa-Laval AB |
| | | Tumba, Sweden |
| [32] | Priority | May 17, 1968 |
| [33] | | Germany |
| [31] | | A29790/45 |

[54] PARTITION WALL FOR SHEDS HAVING AUTOMATIC DUNG SCRAPER
11 Claims, 7 Drawing Figs.

[52] U.S. Cl. .................................................. 119/15,
119/27
[51] Int. Cl. .................................................. A01k 01/00
[50] Field of Search.......................................... 119/15, 22,
27, 28, 16, 155; 198/229, (OX); 214/(Inquired)

[56] References Cited
UNITED STATES PATENTS

| 1,441,841 | 1/1923 | Fink | 119/15UX |
| 2,476,233 | 7/1949 | Wood | 256/10 |
| 2,930,353 | 3/1960 | Sievers | 119/155 |
| 3,016,878 | 1/1962 | Kallal | 119/155 |

*Primary Examiner*—Hugh R. Chamblee
*Attorney*—Davis, Hoxie, Faithfull & Hapgood ABSTRACT: The shed floor includes a cleaning area along which a scraper is movable automatically to remove dung. A partition wall has an opening located above the cleaning area and so dimensioned as to permit a reclining animal to pass through the opening in the event that the animal is entrained by the scraper. While thus passing through the opening, the reclining animal displaces a yieldable barrier means from its normal position extending across the opening, the barrier means having a lower edge spaced above the cleaning area a sufficient distance to permit the scraper to pass freely under the barrier means.

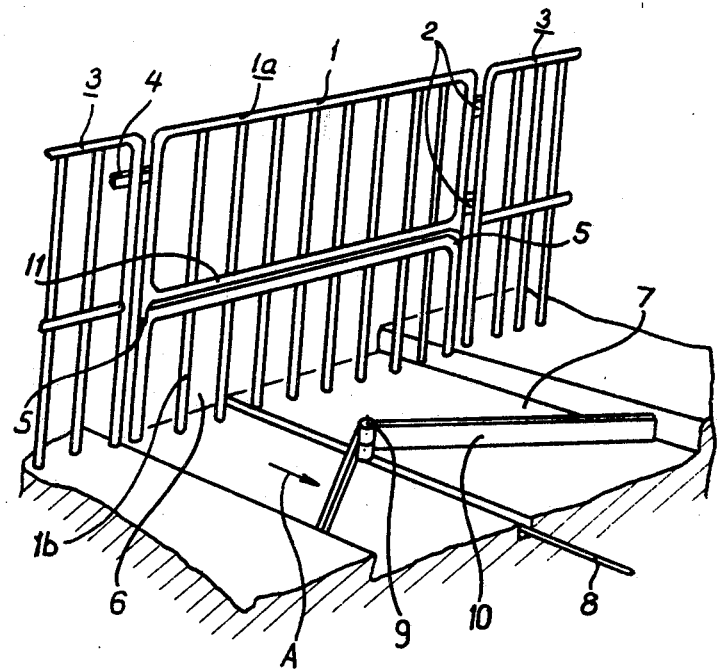

PARTITION WALL FOR SHEDS HAVING AUTOMATIC DUNG SCRAPER

THE DISCLOSURE

This invention relates to animal sheds of the type having a floor from which dung is removed automatically by a scraper movable along a cleaning area of the floor. More particularly, the invention relates to an improved partition wall for such sheds whereby an animal on one side of the wall is prevented from sustaining substantial injury die to the scraper action.

It has been proposed heretofore to remove dung mechanically by scrapers which are moved along the shed floor or along a dung gutter, preferably by means of a drag wire; and such scrapers have recently gone into substantial use due to their economy, cleanliness and technical simplicity. Especially preferred for this use is a scraping device having two scraper wings forming a V-shape with each other and which is moved by a forward dragging wire and a return dragging wire, the device having a stabilizing element fixed to the operating wires and linked to the scraper wings at the region of the point of the V, so as to guide the wings in relation to the wire dragging direction. Such a scraping device is disclosed in U.S. Pat. application Ser. No. 568,919 filed July 29, 1966.

Scraperlike dung removers as described above are particularly well suited for completely automatic operation in which the dung removing periods are determined by means of timers. Due to its low height, the dung scraper can be used in sheds which are divided into individual animal stalls by means of partition walls. The partition walls in this case are designed or arranged in such a way that their lower boundary in the cleaning area of the dung scraper has such a distance to the floor that the dung scraper can pass freely under the partition wall. The practice has proved that healthy animals very soon accustom themselves to the completely automatic removal operation and simply stride across the scraper as it passes through the animal's stall. Leg injuries occuring at the outset in the partition wall area can be prevented by providing partition walls consisting of vertical rod barriers, the lower ends of the rods above the cleaning area of the dung scraper being directed freely downward so that when an animal's leg is accidentally caught between the scraper and the partition wall, the animal can lift the leg between the lattice rods and thereby avoid pinching of the leg.

Practice has proved that only healthy animals are able to react in the above-described manner. Sick animals remain lying on the floor and allow themselves to be entrained by the forward-moving dung remover, so that in the partition wall area grave injuries of the animals can occur and also the dung scraper and the partition wall can be damaged.

The principal object of the present invention is to provide in a shed of the character described, and in which the animals are mainly left completely unattended, a structure for preventing those accidents in the partition wall area which can occur when an animal for some reason fails to stride across the forward-moving dung scraper.

According to the invention, the partition wall above the floor area cleaned by the dung scraper is provided with an opening so dimensioned that a reclining animal can pass therethrough when entrained by the dung scraper, and a yieldable barrier means has a normal position extending across the opening and is displaceable from this normal position by the reclining animal while passing through the opening, the lower edge of the barrier means being spaced above the cleaning area a sufficient distance to allow the dung scraper to pass freely under the barrier means. In the case of sheds for pigs, for example, the height of the opening in the partition wall should not be substantially lower than the height of the withers of the largest pig to be housed in the shed.

Experience has proved that healthy animals respect the blocking of the opening in the partition wall by the barrier means of the invention. On the other hand, if a sick or refractory animal remains lying and allows itself to be entrained by the forward-moving dung scraper, accidents can be avoided by the yielding of the barrier means to the great resistance of a reclining animal body so that the animal can pass uninjured through the opening of the partition wall.

The barrier means of the present invention may be in the form of a rakelike means swingable about one or more upper horizontal shafts and substantially filling the opening, or in the form of similarly suspended plates or similarly suspended lattices or wire nets. According to an embodiment of the invention, the barrier means can also have the form of individual freely hanging rods adapted to swing or be yieldingly bent about upper horizontal shafts parallel to the plane of the partition wall, or the form of freely hanging wires or chains. According to a further embodiment of the invention, the barrier means have the form of one or more cords or wires extending in the transverse or diagonal direction between boundary edges of the opening, or the form of coil springs extending in a similar manner. If the barrier means consist of rigid material, return-moving springs or other biasing means are preferably provided to keep the barrier means in normal position.

The barrier means according to the invention can be made of resilient material. For rigid barrier means, metal, plastic or wood can be used; and for resilient barrier means, metal or plastic can be used.

According to a further embodiment of the invention, the barrier means consists of electrically conducting material suspended in the partition wall by insulating bodies and is provided with connections to a fence current impulse emitter.

Some preferred embodiments of the invention will now be described by way of example and more in detail, reference being had to the accompanying drawings.

IN THE DRAWINGS

FIG. 1 is a perspective view of an embodiment of the invention;

FIG. 2 is a vertical section through a further embodiment of a partition wall and yieldable barrier means according to the invention;

FIG. 3 is an elevational view of a further embodiment of a partition wall and yieldable barrier means according to the invention;

FIG. 4 is a vertical section along the line IV–IV in FIG. 3, seen in the direction of the arrow;

Similar parts of the different embodiments of the invention have the same reference numerals.

Figure 5:
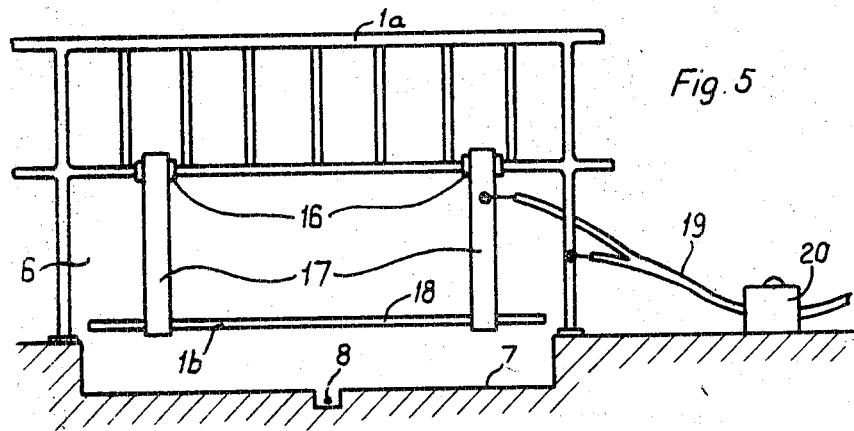
FIG. 5 is an elevational view of a further embodiment of a partition wall and yieldable barrier according to the invention.

The partition wall as shown in FIG. 1 includes a so-called dung path door 1 which by means of door hinges 2 is hung in a stall wall 3, already present in the shed, and can be locked to this wall by means of a catch 4. The upper part 1a of the door when thus locked and the adjacent wall parts 3 may be considered as the partition wall. The door 1 has a lower part 1b linked to said upper part by horizontal hinges 5. The lower part 1b forms a yieldable barrier means which substantially fills an opening 6 in the partition wall and has the form of a rakelike means the points of which are directed downward. Instead of one such rakelike means, several such rakelike means can be provided. The lower ends or points of the barrier means 1b are situated at such a height above the floor and its dung path 7 that the dung scraper movable along this dung path can pass without obstruction (freely) under the barrier means 1b. The dung scraper as shown comprises a drag wire 8 and scraper wings 10 swingable about a vertical hinge 9, essentially as disclosed in the previously mentioned patent application.

The wall part 1a is defined at the bottom by a cross bar 11 which also defines the height of the passage opening 6. The height of this opening 6, as already mentioned, must be such that a reclining animal entrained by the dung scraper can freely pass through the opening. In case partition walls according to the invention are used for pig sheds, it can be mentioned as an approximate measure for the height of the passage opening 6 that the cross bar 11 must be positioned at about the height of the withers of the largest pig to be kept in the shed.

The barrier means 1b can, as shown, be kept in normal position by its own weight. As a modification, return-moving springs (not shown) can be provided so as to keep the barrier means 1b in normal position.

The dung-removing direction of the dung scraper 8—10 is shown by the arrow A in FIG. 1. The dung scraper is thus shown in FIG. 1 in a position in which, while moving forward, it has already passed under the partition wall portion 1a. If an animal behind the partition wall accidentally steps down with a leg between the dung scraper and the partition wall, before the scraper has passed under the partition wall, the animal can lift the leg upward between the scraper and the vertical points of the yieldable barrier means 1b, when the scraper is just moving under the wall.

Healthy animals react as a rule in the described manner. In sheds where the dung scraper operates completely automatically and the feeding and watering of the animals take place completely automatically or mechanically, the animals are for the most part left to themselves for the whole day. Thus, it can escape the animal keeper's attention that an animal has become sick and no longer gets up from the floor when the dung scraper is periodically in action. In such cases, when partition walls are used which have vertical rods extending freely downward in the usual manner, an animal can be subjected to severe injuries or can be killed or the dung scraper and the partition wall can be appreciably damaged. Such accidents will be avoided according to the present invention in that the barrier means 1b will swing forward about its horizontal hinges 5 and allow the reclining animal to pass freely and consequently without injury through the opening 6. When the animal has passed through the opening 6, the barrier means 1b falls back to its vertical normal position under the action of its own weight or under the action of return-moving springs (not shown).

In an embodiment of the invention, the barrier means 1b may comprise individual rods 12 which are swingable about horizontal hinges 5' and extend in or parallel to the partition wall plane and are fastened to the wall part 1a, as shown in FIG. 2. The operation of this embodiment of the invention is essentially the same as that of the embodiment described in connection with FIG. 1.

In a further embodiment of the invention according to FIGS. 3 and 4, the barrier means comprise a plate 13 swingably journaled on horizontal hinges 5" and having its lower edge rounded by means of a horizontal pipe 14 welded to the plate, so that injuries to the animals are avoided. The plate 13 can be kept in normal position by return moving springs 15 constituting biasing means.

The barrier means 1b can also have the form of a lattice or wire net swingably journaled in a manner similar to that shown in FIGS. 2—4.

In the embodiment shown in FIG. 5, the yieldable barrier means comprises two plate springs 17 fixed to the wall part 1a by means of insulating sleeves 16, the free ends of the springs carrying a cross bar 18 of electrically conducting material. The plate springs 17 and the cross bar 18 are connected by wiring 19 to a conventional fence current impulse emitter 20. The barrier means 1b in this embodiment of the invention thus has the form of a conventional rod. This is also sufficient for the intended purpose, since the animals are known to avoid metal parts influenced by current impulses. Sick animals entrained by the dung scraper are irritated by the cross bar 18, influenced by current impulses, but are not injured or killed and can pass uninjured through the opening 6 of the partition wall due to the fact that the plate springs 17 yield to the animal's body as it moves forward when entrained by the dung scraper.

The electrifying of the barrier means 1b as in FIG. 5 can, of course, also be used in connection with the embodiments of the invention shown in FIGS. 1 to 4.

Figure 6:
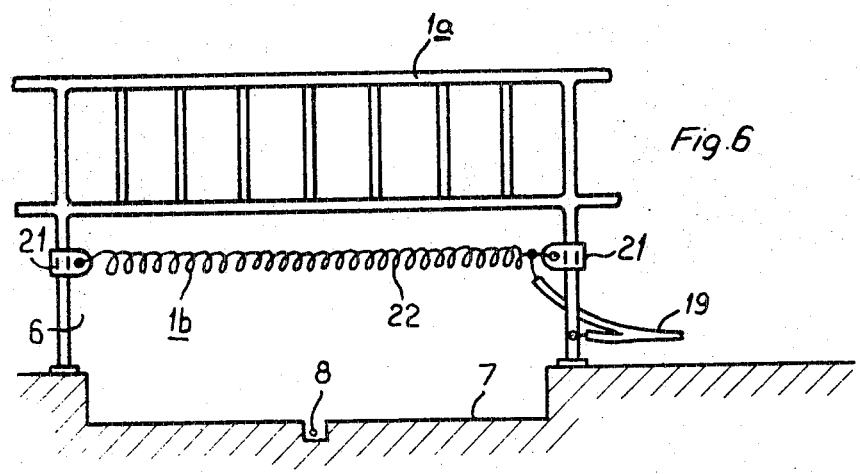
FIGS. 6 and 7 are similar views of still other embodiments of a partition wall and yieldable barrier according to the invention.

A further embodiment of the invention shown in FIG. 6 has as barrier means 1b a coil spring 22 of electrically conducting material which extends between insulation bodies 21 fixed to vertical rods of the partition wall. The spring 22 is connected by means of wiring 19 to an electric impulse emitter (not shown) and extends in a horizontal direction. As a modification, one or more coil springs 22 can be provided and arranged to extend in a sloping or diagonal direction. According to a further modification of this embodiment, the coil springs can be replaced by yielding wires or cords, which can be so thin that they burst when an animal body passes through the opening 6, so that injury to the animal is avoided.

Figure 7:
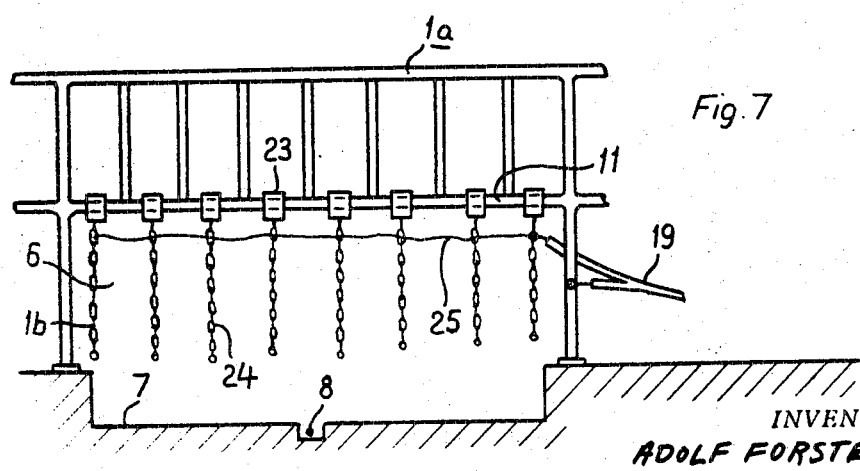

In FIG. 7, the yieldable barrier means comprise chains 24 hanging freely from insulators 23 on the lower horizontal cross bar 11 of the wall part 1a, the chains preferably being connected to each other by means of a wire 25 and by means of wiring 19 to an electric impulse source. As a modification, wires or plate spring ribs hanging freely can be used instead of chains 24.

Although a few examples of the invention are described with reference to the drawings, it will be understood that the invention is not limited thereto but is of the scope set forth in the following claims.

I claim:

1. In combination with an animal shed having a floor including a cleaning area from which dung is to be removed and also having a scraper movable along said cleaning area to remove dung therefrom, a partition wall having an opening above the cleaning area, said opening being of sufficient height so that a reclining animal can pass therethrough, and yieldable barrier means having a normal position extending across said opening and displaceable from said normal position by said reclining animal while passing through the opening, said barrier means having a lower edge spaced above said cleaning area a sufficient distance to permit the scraper to pass freely under the barrier means.

2. A combination according to claim 1, in which said barrier means include rakelike means substantially filling said opening in said normal position and having downwardly directed points, the rakelike means being mounted at the upper portion thereof for swinging movements about a horizontal axis.

3. A combination according to claim 1, in which said barrier means include plate means substantially filling said opening in said normal position, the plate means being mounted at the upper portion thereof for swinging movements about a horizontal axis.

4. A combination according to claim 1, in which said barrier means include lattice means mounted at the upper portion thereof for displacement about a horizontal axis.

5. A combination according to claim 1, in which said barrier means include a horizontal shaft extending parallel to the plane of the partition wall, and rods suspended on the shaft and extending freely downward therefrom.

6. A combination according to claim 1, in which said barrier means include a curtain of freely hanging flexible elements.

7. A combination according to claim 1, in which said barrier means include a flexible element extending generally transversely between the lateral edges of said opening.

8. A combination according to claim 7, in which said flexible element is a coil spring.

9. A combination according to claim 1, comprising also biasing means operatively connected to the barrier means for returning the barrier means to said normal position.

10. A combination according to claim 1, in which said barrier means are made of resilient material.

11. A combination according to claim 1, in which said barrier means are electrically conductive, the combination comprising also insulating means on which the barrier means are suspended, and means connected to the barrier means for supplying an electric current thereto.